(12) United States Patent
Nagel

(10) Patent No.: US 6,173,405 B1
(45) Date of Patent: Jan. 9, 2001

(54) SECURE COMMUNICATIONS CARD MODEM AND METHOD OF USING SAME

(75) Inventor: Paul Nagel, Sandy, UT (US)

(73) Assignee: 3COM Corporation, Santa Clara, CA (US)

( * ) Notice: Under 35 U.S.C. 154(b), the term of this patent shall be extended for 0 days.

(21) Appl. No.: 09/087,307

(22) Filed: May 29, 1998

(51) Int. Cl.[7] .................................................. H04L 9/32
(52) U.S. Cl. .................. 713/200; 455/558; 361/725; 361/686; 235/486
(58) Field of Search .................. 713/200, 201, 713/202; 380/266; 902/26; 705/41; 257/678, 679; 455/557, 558; 439/55, 131; 710/102, 103; 361/725, 727, 686; 235/475, 479, 486

(56) References Cited

U.S. PATENT DOCUMENTS

| | | | |
|---|---|---|---|
| 5,146,472 | | 9/1992 | Hallman .................................... 375/8 |
| 5,183,404 | * | 2/1993 | Aldous et al. ........................... 439/55 |
| 5,336,099 | * | 8/1994 | Aldous et al. ........................... 439/131 |
| 5,338,210 | * | 8/1994 | Beckham et al. ...................... 439/131 |
| 5,375,037 | | 12/1994 | Le Roux ................................. 361/684 |
| 5,377,269 | | 12/1994 | Heptig et al. ........................... 380/25 |
| 5,442,704 | | 8/1995 | Holtey ..................................... 380/23 |
| 5,457,601 | | 10/1995 | Georgopulos et al. .............. 361/686 |
| 5,486,687 | | 1/1996 | Le Roux ................................. 235/382 |
| 5,537,293 | | 7/1996 | Kobayashi et al. ..................... 361/737 |
| 5,546,463 | | 8/1996 | Caputo et al. ........................... 380/25 |
| 5,548,106 | * | 8/1996 | Liang et al. ............................. 235/454 |
| 5,550,861 | | 8/1996 | Chan et al. .............................. 375/222 |
| 5,563,400 | | 10/1996 | Le Roux ................................. 235/486 |
| 5,608,607 | | 3/1997 | Dittmer ................................... 361/686 |
| 5,623,637 | | 4/1997 | Jones et al. ............................ 395/491 |

OTHER PUBLICATIONS

Blondheim, "Information Ecologies and System Design: A Developmental Perspective on Mass Multimedia Networks," Conference Proceedings on Technical Communications at the Great Divide, pp. 220–226, Oct. 1994.*

* cited by examiner

Primary Examiner—Robert W. Beausoliel, Jr.
Assistant Examiner—Christopher Revak
(74) Attorney, Agent, or Firm—Workman, Nydegger & Seeley

(57) ABSTRACT

A secure communications card modem, in general accord with PCMCIA standards, is provided for use in authenticating authorized users to transmit or receive sensitive data. In a preferred embodiment, the communications card modem is configured for use with two sliding interface ports and a connector for interfacing with a host computer. The two sliding interface ports comprise a media connector port and a security port. The media connector port is adapted for receiving a media connector, such as a RJ-11 phone jack. The security port is adapted for receiving a security card. During use, a user inserts a security card into the security port whereupon the security card is authenticated by a reader circuit within the modem. Thereafter, the modem circuitry within the modem is enabled to transmit or receive sensitive data. In the event the reader circuit does not authenticate the security card, the modem circuitry is disabled from transferring data from between the computer and communications line. In the event authentication is not required, the modem circuitry is enabled to transfer data as a conventional modem.

25 Claims, 2 Drawing Sheets

SECURE COMMUNICATIONS CARD MODEM AND METHOD OF USING SAME

BACKGROUND OF THE INVENTION

1. The Field of the Invention

The present invention relates generally to communication card modems. More specifically the present invention relates to a communications card modem for a personal computer useful in the transmission and reception of sensitive data.

2. The Relevant Technology

The rapid increase in the use of distributed computing networks has caused a corresponding increase in the transmission of sensitive data. This has exposed sensitive data to substantial risk. These risks include intrusions by unauthorized users who gain access to the computing network by "hacking" and users with authorization to the networks but who "eavesdrop" on data to which they have no need to know.

Accordingly, computing networks have incorporated security measures to prevent this unauthorized user access to protect and preserve sensitive data. For example, software programs have been installed on computer networks that require users to supply a name and a password during the loading of the operating system. This, however, is inadequate for protecting sensitive data after the initialization process. For example, when a computer is left unattended by an authorized user, an unauthorized user is free to gain access.

Often, password programs are input into these computer networks through a circuit card inserted into an input/output expansion slot of an individual computer. This is problematic for many computers, such as laptop or personal computers (PC), because these computers typically already have their expansion slots filled with other circuit cards. Thereafter, they lack the open architecture that allows for additional expansion slots to accommodate circuit cards that load password programs.

In general, password programs are software inserted between the operating system of the computer and other software applications. Although most password programs are compatible with disk operating systems (DOS) like MS-DOS and PC-DOS, many password programs are still not compatible with Microsoft Windows software programs and higher level DOS.

Conventional password programs are also inadequate because they are typically devoid of protection for modem "dial-up" sessions which require user authentication before sensitive data can be transmitted or received.

More recently, other secure systems have been developed to overcome the inadequacies of the password programs. For example, in U.S. Pat. No. 5,546,463, a portable security device is taught that provides encryption and authentication for data transmissions and reception. This device, however, is an additional piece of computing equipment which can easily be forgotten during transport of portable computers such as PC's. This device also requires additional connectors which increases user costs. These problems also exemplify the shortcomings in other similar related patents teaching modular, portable devices.

Other secure systems, such as "smart cards" have also been developed to provide protection for the transmission and reception of sensitive voice and data signals. In general, the smart card is a small microcomputer with writable, non-volatile memory and a simple input/output interface device fabricated as a single chip that is embedded in a plastic "credit card". For computer use, however, the smart card requires an additional expansion slot in the computer in order to be effective. Again, this is problematic because many PC and other downsized computer styles do not have an architecture that allows the insertion of additional cards into expansion slots. Furthermore, as computers continue to downsize, there will be fewer expansion slots available for additional cards such as smart cards.

Additionally, if the smart card is to be used with a computer for the transmission and reception of data, and only one expansion slot on the computer exists, a user is required to jockey between the card and the modem to effectuate data transfer. At best, this is inconvenient. Although some smart cards have been fabricated as smaller versions of the credit-card style smart cards, these have typically been reserved for use with cellular phones.

Still other security measurements for computing networks include authentication measures that utilize biological attributes of a user. Such systems include retina scanners or fingerprint readers. Although effective, these measures are extraordinarily expensive for users of average computing systems. They can also be inconvenient.

Accordingly, it is desirous to overcome the foregoing shortcomings associated with the prior art devices by providing a novel and improved secure means of transmitting and receiving sensitive data that is useful for computers and computing networks.

OBJECTS AND SUMMARY OF THE INVENTION

It is, therefore, an object of the present invention to provide a secure means for the transmission and reception of sensitive data that is effective beyond the initialization of the computing system configuration.

It is another object of the present invention to provide a secure means for the transmission and reception of sensitive data that does not require an additional expansion slot in the computing system configuration.

It is a further object of the present invention to provide a secure means for the transmission and reception of sensitive data that is compatible with existing hardware and software programs.

It is yet another object of the present invention to provide a secure means for the transmission and reception of sensitive data that is integrated within existing configurations to prevent the rotating of components and/or the requirement of carrying an additional piece of computing equipment.

It is still another object of the present invention to provide a secure means for the transmission and reception of sensitive data that enables user authentication for modem dial-up sessions.

It is a concomitant object of the present invention to provide a secure means for the transmission and reception of sensitive data that is economically feasible for users of average computing systems.

In accordance with the invention as embodied and broadly described herein, the foregoing and other objectives are achieved by providing a secure communications card modem, in general accord with PCMCIA standards, for use in authenticating authorized users before the transmission or reception of sensitive data.

In a preferred embodiment, the communications card modem is configured for use with two sliding interface ports and a connector for interfacing with a host computer. The two sliding interface ports comprise a media connector port and a security port. The media connector port is adapted for receiving a media connector, such as a RJ-11 phone jack. The security port is adapted for receiving a security card. Both sliding interface ports are at one end of the modem while the connector is at another end.

During use, a user inserts a security card into the security port whereupon the security card is authenticated by a reader circuit within the modem. Thereafter, the modem circuitry within the modem is enabled to transmit or receive sensitive data. In the event the reader circuit does not authenticate the security card, the modem circuitry is disabled from transferring data from between the computer and a communications line. In the event authentication is not required, the modem circuitry is enabled to transfer data as a conventional modem.

These and other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered to be limiting of its scope, the invention in its presently understood best mode for making and using the same will be described and explained with additional specificity and detail through the use of the accompanying drawings in which.

DETAILED DESCRIPTION OF THE PREFERRED EMBODIMENTS

Figure 1:
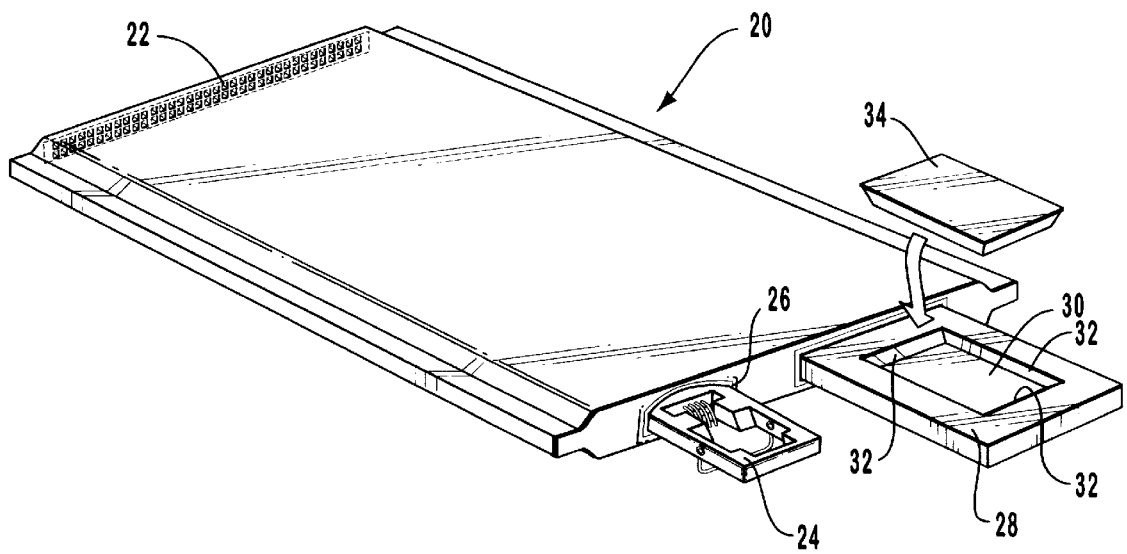
FIG. 1 is a perspective view of a secure communications card modem in accordance with the present invention.

The present invention is a secure communications card modem for a computer, especially a personal computer (PC), useful in the transmission and reception of sensitive data. It is a feature of the present invention to configure a communications card modem with a security port to provide authentication of authorized users before the transmission or reception of sensitive data over a communications line.

As used herein, "sensitive data" includes any and all data such as proprietary, vulnerable, confidential, secret, susceptible and other data indicated to be restricted from use by all users.

As used herein, "communications card modem" or "modem" refers to a communications card modem falling within the memory card parameters defined by the Personal Computer Memory Card International Association (PCMCIA). As such, a modem, which is a type II card, is substantially a rectangular space approximately 55 mm in width, 85 mm in length, and 5 mm in depth. Thus, a communications card modem also refers to PCMCIA architecture modem cards, PCMCIA architecture network cards, such as a LAN, or equivalents thereof. In operation, a typical communications card modem is used in a PCMCIA "expansion slot" or "slot" on a PC to facilitate the serial transfer of data from a PC to a media connector for transmission over a communication line. An expansion slot on a PC suitable for containing a type II modem is herein defined as either a type II or a type III slot well known in the art.

As used herein, a communications card modem is also configured as a compatible interface between the phone lines and a computer in accordance with the guidelines established by, both, the Federal Communications Commission ("F.C.C.") and various regional telephone companies. In accordance therewith, a presently required portion of this interface includes a Data Access Arrangement ("DAA") circuit. The DAA circuit provides an impedance match and also serves to isolate the modem and the computer from transient signals and other disturbances coming in over the phone line. In this manner, the modem acts as a protective barrier between the computer and the phone lines and moderates all signals or energy being input into the phone lines. This protects the phone lines and related systems from damage.

As used herein, a "media connector" or "miniature modular jack physical/electrical media connector" connotes a media connector such as those connectors having physical attributes described in F.C.C. part 68, sub-part F, expressly incorporated herein by reference. Specific media connectors such as a RJ-11 or a RJ-45 are merely references to a specific exemplary media connector falling within the broader parameters of the term "media connector" and should not be used to limit the scope of the present invention to specific connectors.

As used herein, a "communications line" refers to those devices suitable for transferring data from one computing system configuration to another. As such, typical communication lines include, but are not limited to, phone lines, network cables, coaxial cables, shielded and unshielded twisted pair cables and other similar data transferring devices.

With reference to FIG. 1, a communications card modem in accordance with the present invention for transmitting and receiving data is depicted generally as 20. At one end of the modem 20 is a connector 22 for electrically interfacing with a computer. Preferably, the connector 22 is a 68 pin connector well known to those skilled in the art but may additionally be any connector type suitable for interfacing between a modem and a computer.

At the other end of the modem 20 is a first port, a media connector port 24, for affording interface capabilities between a media connector and a communications line. Many embodiments of media connector ports are commercially available, but a slidable or "pop-out style" port has emerged as a preferred media connector port. This port, known commonly as the XJACK® initially produced by MEGAHERTZ Corp., now owned by 3 Com Corp., solves many of the interface problems posed by prior art devices. For example, since a typical media connector, such as an RJ-11, has a depth thickness of about 8 to about 12 mm and the depth thickness of a PCMCIA style modem (type II card) is about 5 mm, a depth incompatibility problem exists that impacts upon the interfacing between the two devices. The XJACK, however, has solved this depth incompatibility problem because the media connecter port "pops-out" from the modem and the media connector is inserted vertically into the media connector port instead of horizontally as is attempted with other prior art devices.

The XJACK has also solved additional problems such as: (i) the elimination of carrying along an extra interfacing device compatible with both the media connector port and the communications card modem; (ii) the elimination of ensuring a DAA in the modem is compatible with the computer; (iii) the elimination of physical interference between adjacent communication card modems in adjacent slots when the modem has an enlarged portion thereof larger than the conventional 5 mm thickness; (iv) the elimination of potential breakage of the media connector port when not in use; and (v) the elimination of protrusions beyond the normal dimensions of the computer so that the PC portfolio is more compatible with devices typically transporting portable PC's.

As depicted in FIG. 1, a typical embodiment of a sliding interface media connector port for directly interfacing with a media connector is depicted as slidably engaged with a housing 26 of the modem 20. However, it should be appreciated that even further embodiments of the media connector port 24 suitable for slidably engaging the housing 26 and for accepting a media connector during use are contemplated within the scope of the present invention. These further embodiments are more fully described in U.S. Pat., Nos., 5,183,404, 5,336,099 and 5,338,210 and are all expressly incorporated herein by reference.

On the same end of the modem 20 as the media connector port 24, is a second port, a security port 28. In general, the security port 28 is a port slidably engaged with housing 26 in a manner similar to the media connector port 24. A cavity 30 having a plurality of walls 32 is formed within the security port 28. The cavity 30 is adapted in size and shape so as to be capable of receiving a security card 34.

During use, the security port is slidably extended from the housing 26 by biasing mechanisms that urge the security port 28 outward from the housing 26 so that a user may insert a security card into cavity 30. The security port 28 is then pushed, by the user, back towards the housing 26 until the security port is confined substantially within the housing 26. To retrieve the security card from the security port 28 within the housing 26, the user merely pushes against the security port 28 to enable the biasing mechanisms to slidably extend the security port. Preferably, the cavity 30 is so sized and shaped to be able to receive the security card 34 so that when the security card is slid into the housing 26, the security card does not interfere with the housing 26.

The particular biasing mechanisms urging the security port outward from the housing 26 and the locking mechanisms for confining the security port within the housing are also described in detail, in reference to the media connector port, in U.S. Pat. Nos. 16 5,183,404, 5,336,099 and 5,338, 210. Again, these patents are expressly incorporated herein by reference. Preferably, the biasing mechanisms comprise spring arrangements urging the security port 28 outward from the housing 26.

The security card 34 inserted into the security port 28 is exemplary of the smaller versions of the smart cards conventionally available. Much like their larger "credit card" counterparts, the smaller smart cards have on-board microprocessors and non-volatile memory embedded in a plastic package. Preferably, these security cards also have identifying features particular to authorized users. Identifying features are well known in the art and can be personal identification numbers (PINS) or other similar features.

Figure 2:
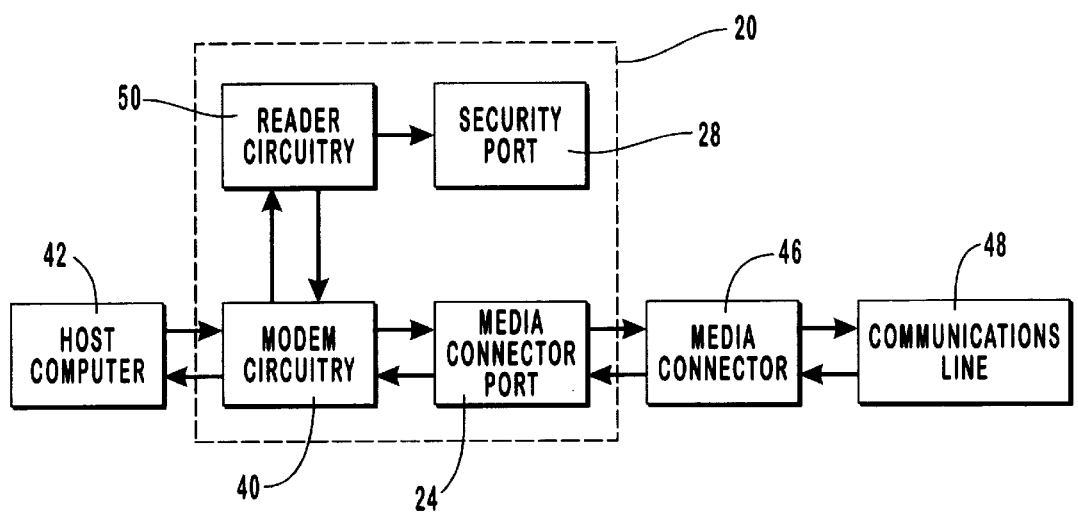
FIG. 2 is a block diagram of exemplary circuitry useful with the secure communications card modem of FIG. 1.

With reference to FIG. 2, an exemplary circuitry structure suitable for use with modem 20 is depicted. The circuitry structure comprises modem circuitry 40 for interfacing between a host computer 42 and the media connector port 24. The modem circuitry 40 is well known and includes individual components, integrated circuits, printed circuit boards and other similar hardware devices for transferring data between the host computer and the media connector port for, ultimately, transmitting or receiving data over a media connector 44 interfaced with a communications line 46. Preferably, the modem circuitry 40 is configured for serial transmission or reception of data.

Since data itself is sometimes sensitive, computers are often configured to authenticate that the user sending or receiving the data is authorized to do so. Thus, the advent of security measures. In this embodiment, the modem 20 is configured with the security port 28 and security card 34 to indicate to the modem that an authorized user is transmitting or receiving data. Coordinating with the security port to authenticate the security card in the security port is reader circuitry 50.

Figure 3:
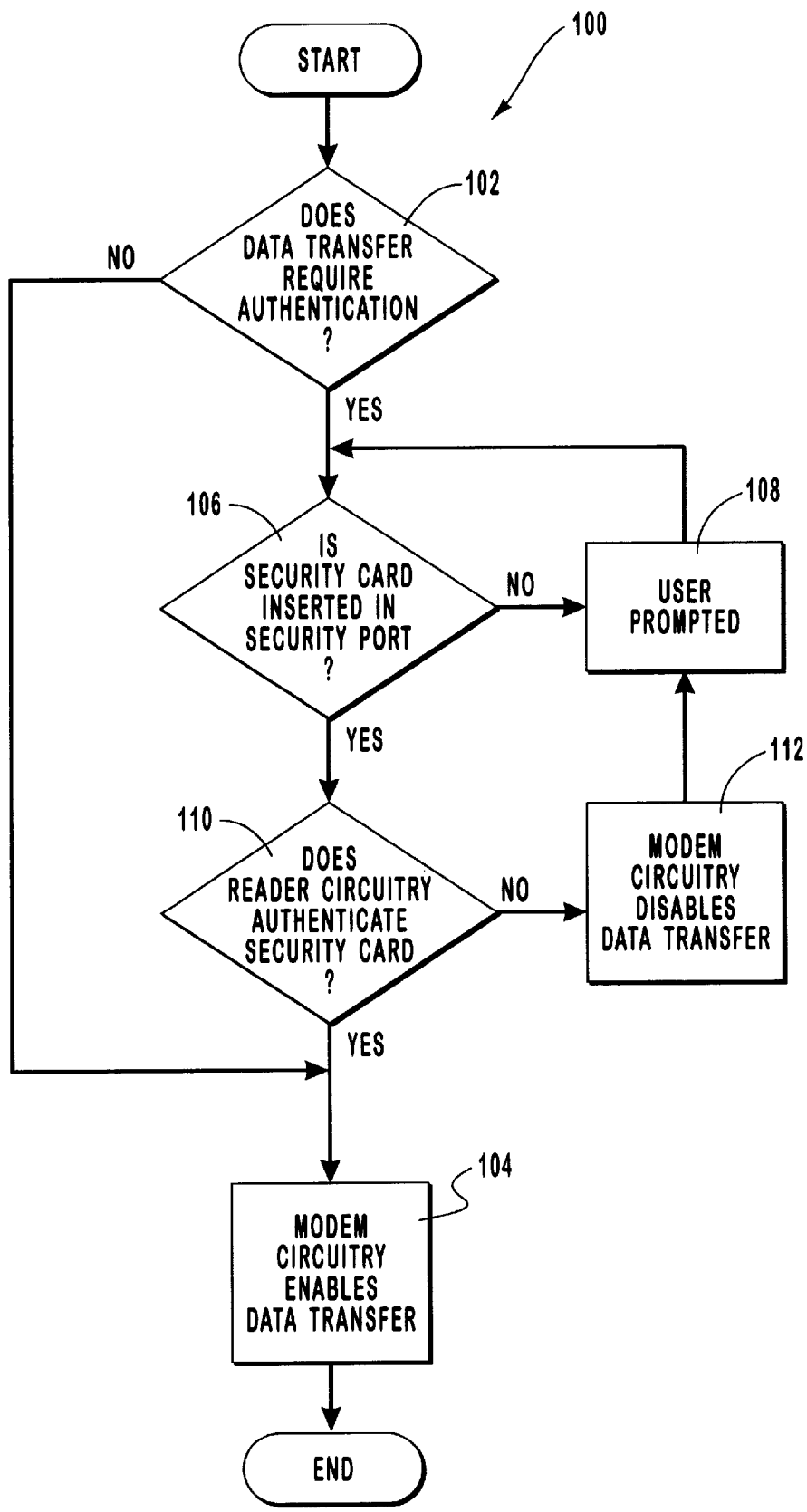
FIG. 3 is a flow diagram of an exemplary operating structure useful in authenticating authorized users to transmit and receive sensitive data in accordance with the present invention.

With reference to FIG. 3, a flow diagram of an exemplary operating structure useful in authenticating authorized users to transmit or receive data in accordance with the exemplary circuitry structure is depicted generally as 100.

During use, some modem dial-up sessions or before transmissions or receptions of sensitive data, a user is asked to authenticate that they are authorized users. When this occurs, a user is cued by computer software that the data "transfer", i.e., transmission or reception, requires authentication, step 102. If, in fact, the data transfer does not require authentication, the modem circuitry is enabled for data transfer, step 104, between the computer and the communications line as is conventionally done in modems. If the data transfer does require authentication at step 102, the modem circuitry ascertains whether the security card is inserted in the security port at step 106.

If the security card is not within the security port, the user is prompted at step 108 to take corrective action. The modem circuitry then again determines whether the security card is inserted, step 106.

If the security card is within the security port, the modem circuitry ascertains whether the reader circuitry authenticates the security card, step 110. If the reader circuit does not authenticate the security card, the reader circuit communicates with the modem circuitry such that the modem circuitry is disabled from data transfer, step 112. Thereafter, the user is prompted 108 to take corrective action.

It should be appreciated that whenever the user is prompted at step 108 to take corrective action that an infinite loop can develop between the various steps. If, in fact, the user can never remedy a problem with corrective action, computer software can intervene such that a user can use escape features, well known in the art, to avoid attempting to transfer data and return to other software applications. If a user is an unauthorized user, however, and an infinite loop develops, the unauthorized user is prohibited from transmitting or receiving sensitive data. Conversely, at step 110, if the reader circuit does authenticate the security card, the modem circuitry is enabled for data transfer at step 104.

The foregoing embodiments represent a substantial advancement in the art of transferring data with communications card modems configured for use with computers such as a PC. For example: (i) secure means are provided for the transmission and reception of sensitive data that is effective beyond the initialization of the computing system configuration; (ii) the security port of the present invention does not require an additional expansion slot in the computing system configuration beyond that which is already being used for the communications card modem; (iii) since the communications card modem is already compatible with the hardware and software programs of the computer, the addition of an integrated security port and reader circuit does not change the compatibility with existing hardware and software programs; (iv) since the security port is integrated with the communications card modem, there is no longer any requirement to jockey or rotate between components; (v) there is no longer any requirement for users to carry additional pieces of computing equipment; (vi) the communications card modem enables user authentication for modem dial-up sessions; and (viii) the present secure system is economically feasible for users of average computing systems.

The foregoing embodiments, however, are merely representative and are not to be construed as limiting. As such, various other alternative embodiments are recognized as being within the scope of the present invention that find equal applicability herein. For example, the cavity of the security port may alternatively be configured with sloping edges (FIG. 1), beveled edges, socket pin arrangements, guide bumps or other similar features so that substantially only one orientation of the security card is allowed when inserted into the cavity.

Additionally, the security port can be electrically configured such that the when the security card is inserted, the reader circuit can authenticate the security card without requiring the security port to be pushed in and confined within the housing of the modem.

The arrangement of both the media connector port and the security port may alternatively be movable from within the housing to outside the housing by pivoting or rotating mechanisms.

The security port may be configured to directly receive an identifying source of information for a user, thus, rendering the reader circuit superfluous. For example, the security port may be configured to receive a PIN directly on the security port. The PIN could be entered by a plurality of dual-in-line position (DIP) switches well known in the art or may be a small keypad adapted for entry with the tip of a pen or pencil. Still other devices could be configured onto the security port for directly identifying and authenticating authorized users. What remains important is that the communications card modem is configured with an integrated security means for readily authenticating users where, heretofore, such devices where unknown with communication card modems.

Still other security port and media connector port embodiments are contemplated with Type III PCMCIA cards such as ports with much larger widths and mechanisms providing the rotation of the ports from within the housing to outside of the housing.

In the event that component costs are not a concern for the user or manufacture of the communications card modem, the security port may be reconfigured with more expensive means of identifying and authenticating authorized users. Such means include a fingerprint pad positioned on the security port that is read or verified by a fingerprint reader within the modem housing.

The present invention may be embodied in still other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A secure communications card modem having a housing, comprising:
    a media connector port extendable from said housing adapted for reception of a media connector interfaced with a communications line suited for transmission or reception of data, said housing being substantially received within a host computer;
    a security port extendable from said housing in a first position for reception of a security card without removal of said communications card modem from said host computer, and retractable in a second position substantially received within said host computer, said security card for providing authentication before transmission or reception of said data; and
    a host connector coupled to said housing for interfacing with said host computer.

2. A secure communications card according to claim 1, further comprising a reader circuit for facilitating authentication before transmission or reception of said data.

3. A secure communications card modem according to claim 1, further comprising a modem circuit for one of transferring said data from said media connector port when said data is received through said communications line and transferring said data to said media connector port for transmission of said data through said communications line.

4. A secure communications card modem having a housing for use in authenticating authorized users to transmit or receive data over a communications line, comprising:
    a host connector for interfacing with a host computer;
    a media connector port extendable from within said housing for interfacing with said communications line, said housing being substantially received within a host computer;
    a security port extendable from within said housing in a first position for reception of a security card without removal of said communications card modem from said host computer, and retractable in a second position substantially received within said host computer;
    a modem circuit for transferring said data between said host connector and said media connector port during use of said host computer; and
    a reader circuit for authenticating said security card to enable said modem circuit to transfer said data.

5. A secure communications card modem according to claim 4, wherein said security port is slidably engaged with said housing of said secure communications card modem.

6. A secure communications card modem according to claim 5, wherein said security port has a cavity to receive said security card therein so that when said security port is slid into a housing of said secure communications card modem, said security card does not interfere with said housing.

7. A secure communications card modem according to claim 4, wherein said security port is configured to receive said security card in substantially only one orientation.

8. A secure communications card modem according to claim 4, wherein said media connector port is slidably engaged with said housing of said secure communications card modem.

9. A secure communications card modem according to claim 4, wherein said connector is a 68 pin connector.

10. A secure communications card modem according to claim 4, wherein said housing is configured in size and shape according to type II PCMCIA standards.

11. A secure communications card modem for use in authenticating authorized users to transmit or receive data over a communications line, comprising:

a housing for being substantially received within a host computer;

a pin connector for interfacing with a host computer;

a media connector port slidably engaged with said housing and adapted for reception of a media connector, said media connector interfaced with said communications line;

a security port slidably engaged with said housing adapted for reception of a security card, said security port being extendable from said housing in a first position for reception of a security card without removal of said communications card modem from said host computer, and retractable in a second position substantially received within said host computer;

a modem circuit for transferring said data between said pin connector and said media connector port during use of said computer; and a reader circuit for authenticating said security card to enable said modem circuit to transfer said data.

12. A secure communications card modem according to claim 11, wherein said security port has a cavity configured to receive said security card such that when said security port is slid into said housing, said security card does not interfere with said housing.

13. A secure communications card modem according to claim 12, wherein said housing is configured in size and shape according to type II PCMCIA standards.

14. A secure communications card modem according to claim 13, wherein said pin connector is configured for 68 pins.

15. A system for authenticating whether a user is authorized to transmit or receive data over a communications line, comprising:

a host computer for interfacing with said user, said host computer being configured to transmit or receive said data;

a communications card modem having a housing interfaced with said host computer, said housing being substantially received with a host computer, said communications card modem having
  a) a media connector port extendable from said housing;
  b) a security port extendable from said housing in a first position for reception of a security card without removal of said communications card modem from said host computer, and retractable in a second position substantially received within said host computer, said security card for providing authentication of said user; and
  c) modem circuitry for transferring said data between said host computer and said media connector port; and a media connector adapted for insertion into said media connector port of said communications card modem, said media connector being interfaced with said communications line for transmitting or receiving said data between said communications card modem and said communications line.

16. A system according to claim 15, wherein said security port of said communications card is configured to receive a security card.

17. A system according to claim 15, wherein said communications card modem further comprises a reader circuit for communicating with said security port to authenticate said user.

18. A system according to claim 15, wherein said security port of said communications card modem is extendable from within a housing of said communications card modem.

19. A system according to claim 18, wherein said security port of said communications card modem is slidably engaged with said housing.

20. A system according to claim 15, wherein said media connector port of said communications card modem is extendable from within a housing of said communications card.

21. A system according to claim 20, wherein said media connector port of said communications card modem is slidably engaged with said housing.

22. A method for authenticating whether a user is authorized for transmission or reception of data over a communications line, comprising the steps:

providing a communications card modem having a housing for use between a host computer and communications line, said housing being substantially received within said host computer, said communications card modem having a security port, a reader circuit, a modem circuit and a media connector port for reception of a media connector interfaced with said communications line;

extending said security port from said housing of said communications card modem to a first position for reception of a security card without removal of said communications card modem from said host computer;

inserting said security card into said security port;

retracting said security port into a second position substantially received within said host computer;

determining whether said reader circuit authenticates said security card;

if said reader circuit does not authenticate said security card, disabling said modem circuit from transferring data from between said host computer and said media connector port; and if said reader circuit does authenticate said security card, enabling said modem circuit to transfer said data from between said host computer and said media connector port.

23. A method according to claim 22, further comprising the step of determining whether the transmission or reception of said data requires authentication.

24. A method according to claim 23, further comprising the step of enabling said modem circuit to transfer said data from between said host computer and said media connector port if the transmission or reception of said data does not require authentication.

25. A method according to claim 22, further comprising the step of prompting said user to take corrective action if said modem is disabled from transferring data from between said host computer and said media connector port.

* * * * *

UNITED STATES PATENT AND TRADEMARK OFFICE
CERTIFICATE OF CORRECTION

PATENT NO. : 6,173,405 B1  
DATED : January 9, 2001  
INVENTOR(S) : Paul Nagel

Page 1 of 1

It is certified that error appears in the above-identified patent and that said Letters Patent is hereby corrected as shown below:

Column 5,  
Line 49, after "Pat. Nos." delete "16"

Column 8,  
Line 18, after "communications card" insert -- modem --

Column 9,  
Line 62, after "communications card" insert -- modem --

Signed and Sealed this

Twenty-ninth Day of January, 2002

Attest:

Attesting Officer

JAMES E. ROGAN  
*Director of the United States Patent and Trademark Office*